United States Patent [19]

Hartmann et al.

[11] 4,060,584
[45] Nov. 29, 1977

[54] PROCESS FOR RECOVERY OF IRON OXIDE AND CHLORINE FROM DUST PRODUCED IN CHLORINATION OF TITANIFEROUS ORES

[75] Inventors: Achim Hartmann; Achim Kulling; Hans Thumm, all of Leverkusen, Germany

[73] Assignee: Kronos Titan G.m.b.H., Leverkusen, Germany

[21] Appl. No.: 768,542

[22] Filed: Feb. 14, 1977

[30] Foreign Application Priority Data

Mar. 19, 1976  Germany .................. 2611667

[51] Int. Cl.$^2$ .................. C01G 49/06; C01B 7/03
[52] U.S. Cl. .................. 423/149; 423/79; 423/500; 423/633
[58] Field of Search .................. 423/74, 79, 149, 500, 423/493, 633; 75/25, 1 T

[56] References Cited

U.S. PATENT DOCUMENTS

| | | | |
|---|---|---|---|
| 3,325,252 | 6/1967 | Wikswo et al. | 423/633 |
| 3,793,444 | 2/1974 | Reeves | 423/633 |
| 3,865,920 | 2/1975 | Dunn | 423/74 |
| 3,925,057 | 12/1975 | Fukushima | 423/149 |

FOREIGN PATENT DOCUMENTS

| | | | |
|---|---|---|---|
| 306,691 | 2/1929 | United Kingdom | 423/633 |
| 1,407,034 | 9/1975 | United Kingdom | 423/500 |

*Primary Examiner*—Earl C. Thomas
*Assistant Examiner*—Brian E. Hearn

[57] ABSTRACT

The dust produced in the chlorination of titaniferous ores comprises essentially particulate ferrous chloride plus solid contaminants including coke and various metal chlorides and oxides and is oxidized in successive stages at relatively low temperatures to recover particulate iron oxide and gaseous chlorine.

7 Claims, 1 Drawing Figure

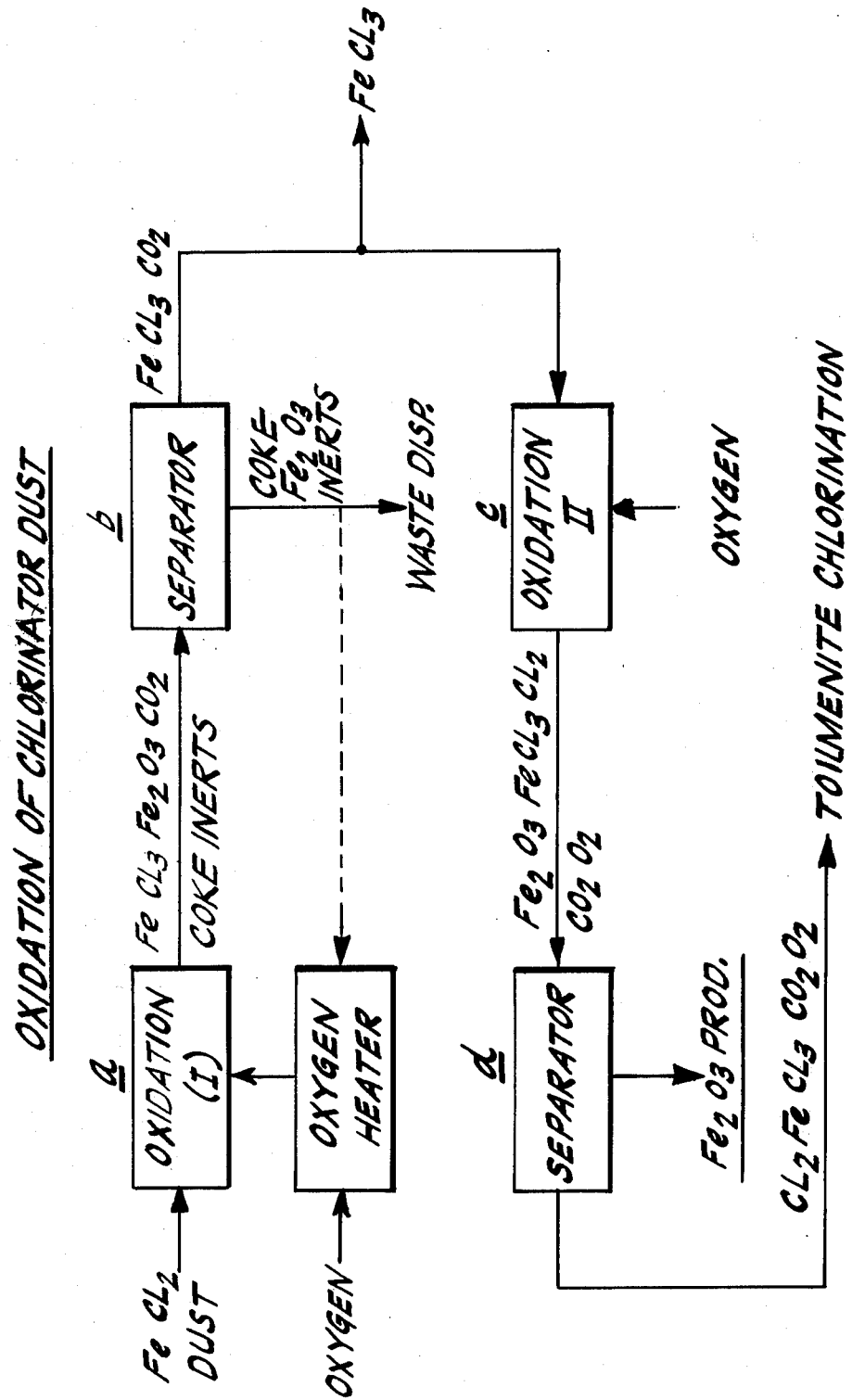

PROCESS FOR RECOVERY OF IRON OXIDE AND CHLORINE FROM DUST PRODUCED IN CHLORINATION OF TITANIFEROUS ORES

BACKGROUND OF INVENTION

In the chlorination of titaniferous materials, as for example, titanium-containing ores such as ilmenite, by reacting chlorine and carbon with the ore at elevated temperatures to produce titanium tetrachloride, large amounts of dust are formed which comprise essentially particulate ferrous chloride contaminated with $TiO_2$, coke and other metal oxides and chlorides, as for example, magnesium chloride and manganese chloride. The nature of this dust, hereinafter referred to as chlorinator dust, is such that it would constitute an environmental nuisance if stored or disposed of as land fill. It is desirable therefore to use the chlorinator dust as a source material for production of useful products such as iron oxide and gaseous chlorine, the latter, for example, for use in chlorinating titaniferous ores.

There are several known processes for recovering iron oxide and chlorine by oxidation of iron chlorides. For example, U.S. Pat. No. 3,325,252 discloses oxidizing a mixture of iron chlorides consisting essentially of ferric chloride in two stages, partial oxidation being carried out in the first stage by reacting the mixture of iron chlorides with oxygen at temperatures from 650°–1000° C. and then continuing the oxidation reaction in a second stage at temperatures above 450° C. and preferably from 50°–100° C. below the temperature prevailing in the first stage of the process. However, this and similar processes for oxidizing ferric chloride are not regarded as pertinent to the process of the instant invention since the latter is directed specifically to the oxidation of chlorinator dust which is essentially particulate ferrous chloride contaminated with coke and other metal chlorides and oxides.

The prior art also discloses methods for oxidizing ferrous chloride to form iron oxide ($Fe_2O_3$) and gaseous chloride. For example, in British Pat. No. 1,407,034 (German Pat No. 2,337,099) ferrous chloride in the vapor phase is reacted with oxygen in excess of that required stoichiometrically for conversion of the ferrous chloride to ferric oxide; and at temperatures sufficiently high to avoid condensation of the ferrous chloride; while U.S. Pat. No. 3,865,920 preheats ferrous chloride at 980° to 1110° C. and then contacts it with oxygen, thereby to form a mixture of iron chlorides, iron oxide, oxygen and chlorine - which mixture is cooled and the residual iron chloride converted to iron oxide and chlorine. U.S. Pat. No. 2,954,274 teaches oxidizing ferrous iron chloride by means of air or oxygen at temperatures from 400°–1000° C. in fluidized bed of iron chloride and optionally iron oxide (column 6, lines 3-10); and U.S. Pat. No. 3,793,444 describes oxidizing vaporous iron chloride by passing a mixture of the iron chloride and oxygen through several superposed zones subdivided by walls and in the presence of recycled inert solid particles. The process is thus concerned with oxidation of vaporous iron chloride and not chlorinator dust, that is to say, a mixture of particulate ferrous chloride plus coke and other metal chlorides and oxides; and requires relatively complicated equipment which gives rise to frequent operational difficulties.

With respect to the oxidation of chlorinator dust, many unexpected difficulties were encountered due to the physical characteristics of the dust. For example, efforts to oxidize the dust according to the vapor phase process of British Pat. No. 1,407,034 were unsuccessful due to the difficulty in volatilizing the dust. Thus when sufficiently high temperatures and energy were used to volatilize the dust the presence of the oxygen effected deposition of solid iron oxide on the walls of the reactor — and these difficulties were increased due to the contaminants in the dust. For example, a typical chlorinator dust may comprise as high as 25% coke. Further, mechanical separation of the particulate ferrous chloride from the contaminants, prior to oxidation, is not feasible in as much as the ferrous chloride is firmly combined with the contaminants as a coating thereon. Moreover if, on the other hand, the dust is oxidized then the iron oxide so produced is highly contaminated and hence unsuitable for its intended use. And further, if oxidation of the dust is carried out at high temperatures, that is in excess of 800° C., the coke present in the dust is burned up thereby producing hot spots in the reactor which effect sintering of the iron oxide accompanied by a buildup of the oxide on the walls which leads to clogging within a short time. Also, at these high temperatures the gaseous chlorine produced is strongly diluted with $CO_2$ and hence is unsuitable for immediate recycling to the chlorinator and, obviously, efforts to concentrate the dilute chlorine involves great expense and hence are unacceptable. Moreover, it is difficult to apply required auxiliary energy from the outside of the reactor. A powerful heating-up of the walls of the reactor could easily lead to ignition of the coke which, in the presence of oxygen, would cause the oxidation reaction to proceed out of control. The aforementioned U.S. Pat. No. 3,325,252 teaches multistage oxidation of ferric chloride and while multistage oxidation of chlorinator dust at high temperatures was found to improve yield, it does not solve the problem of contaminating the end-products.

Finally, at the high temperatures taught by the prior art, the equilibrium for oxidation of the ferric chloride is far to the side of ferric chloride and hence complete oxidation is not effected. It has now been found however, that by conducting the oxidation of the chlorinator dust in successive stages and at relatively low temperatures, substantially complete oxidation of the iron chloride to ferric oxide will take place; and that the major portion of iron oxide and gaseous chlorine so formed will be in sufficiently pure form for commercial applications.

SUMMARY OF INVENTION

The present invention relates to the discovery of a novel process for oxidizing chlorinator dust comprising particulate ferrous chloride, coke and various metal chlorides and oxides by reacting the dust in successive stages at relatively low temperatures with oxygen or an oxygen containing gas to produce a major portion of substantially uncontaminated iron oxide ($Fe_2O_3$) and gaseous chlorine. In particular, the process of this invention is characterized by the following steps:

a. The chlorinator dust comprising essentially ferrous iron chloride is first reacted at temperatures between 500° and 800° C. with only so much oxygen that solid $Fe_2O_3$ and gaseous ferric iron chloride are formed. Essentially no chlorine is formed;

b. the solid ferric iron oxide so produced, may contain coke and other contaminants, and these solids are separated from the gaseous products of the reaction at temperatures from 500° to 800° C;

c. the gaseous products of the reaction, i.e. ferric iron chloride and CO₂, if present, are reacted with additional oxygen to form gaseous chlorine and additional solid Fe₂O₃, the reaction being started at temperatures between 600° and 800° C., the temperature being gradually lowered to below 600° C.; and d. the solid Fe₂O₃ formed in step c is separated from the gases produced in stage c.

This procedure avoids, to a large extent, the disadvantages of the prior art processes.

DESCRIPTION OF DRAWING

The drawing is a schematic flow diagram illustrating the essential steps of the oxidation process of this invention.

PREFERRED EMBODIMENT OF INVENTION

Referring to the drawing, step a of the oxidation process occurs essentially according to equation I:

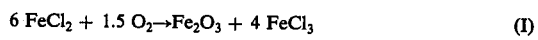
$$6\ FeCl_2 + 1.5\ O_2 \rightarrow Fe_2O_3 + 4\ FeCl_3 \quad (I)$$

Since the reaction is carried out at relatively low temperatures, i.e. 500° to 800° C., combustible secondary constituents of the chlorinator dust, such as carbon, are definitely not oxidized. For this reason no overheating or sintering of the iron oxide occurs and the reaction can be easily controlled. The solid iron oxide formed is relatively coarse and has substantially no tendency to adhere to the reactor walls and hence the iron oxide together with the secondary solid constituents of the chlorinator dust, such as coke, are easily separated from the gas mixture, the essential constituent of which is gaseous ferric iron chloride. The oxygen used in step a is substantially stoichiometric and hence no chlorine is formed, the amount of oxygen used being calculated from the composition of the chlorinator dust employed with the aid of the above stated equation. The separation of this solid iron oxide and other solids from the gas mixture (step b) is carried out at the prevailing temperatures of 500° to 800° C. using conventional separating means; and the ferric iron chloride containing gas mixture can be worked up further without loss of energy. Thus the gaseous ferric iron chloride of step b may be condensed and separated from the other constituents of the gas mixture; and because of its purity can be used in various fields, for example, in water purification. However, it is preferred to react the gas mixture containing the ferric iron chloride with additional oxygen (step c) to form additional solid Fe₂O₃ and gaseous chlorine according to the equation:

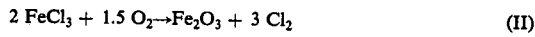
$$2\ FeCl_3 + 1.5\ O_2 \rightarrow Fe_2O_3 + 3\ Cl_2 \quad (II)$$

and subsequently in step d to separate the substantially pure Fe₂O₃ so formed from the chlorine-containing gas mixture.

A great advantage of the process according to the invention consists in the fact that the solid iron oxide produced in successive steps c and d is substantially uncontaminated and may be worked up further directly, for example, in the smelter industry or for the purpose of manufacturing iron oxide pigment. If the reaction according to equation 2 runs to completion in step c then twice as much iron oxide is formed as in step a; hence the greater part of the iron values of the chlorinator dust is here obtained in usable form. The reaction of step c occurs, to a greater or lesser extent, depending on the temperature at which oxidation of the gaseous ferric iron chloride is carried out. Preferably the reaction of step c is carried out in such a way that it is started initially at temperatures between 600° C and 800° C. and thereafter is gradually lowered to below 600° C. It is particularly advantageous to lower the temperature to as low as 350° C. In this connection the gaseous ferric chloride mixture is introduced from the preceding step, i.e. step b, into the oxidation reactor of step c without heating or cooling which procedure effects relatively simple reaction control and the use of simply constructed devices. As the temperature is lowered the equilibrium of equation (2) is shifted to an increasing extent in the direction of the Fe₂O₃ formation so that an extensive almost complete iron oxide formation is achieved. Any further lowering of the temperature, that is to say, below 350° C. is not advisable as a rule in order to avoid condensation of any unreacted gaseous ferric iron chloride.

Since the reaction in step a is weakly exothermic, it is necessary to introduce energy in order to heat the chlorinator dust to reaction temperature and to compensate for the heat losses occuring due to radiation, and so forth. The heat addition can be carried out by a preliminary heating of one or both reaction constituents. A preferred form of carrying out the process according to the invention comprises preheating the oxygen before step a by combustion of a suitable fuel material; and can be carried out directly in that, for example, the fuel is burned in the oxygen stream before being fed into the reactor; or the oxygen stream may be mixed with hot combustion products or heated indirectly by passing over heat exchange surfaces. As fuel materials, any desired substances may be employed in so far as they do not form products which have an unfavorable influence on the oxidation of the ferrous or ferric iron chlorides. Thus, they should be essentially free of hydrogen or hydrogen compounds. Suitable fuel materials are, for example, carbon monoxide and carbon. In case the ferrous iron chloride dust includes coke, this too may be employed as fuel material. Moreover, if the solid mixture separated in step b contains coke, this solid mixture may, at least in part, be reacted with excess oxygen, or a gas mixture containing oxygen, at a temperature above the ignition point of the coke and the preheated oxygen containing gas mixture separated from the solid materials and introduced into step a. It is possible that either the entire solid mixture separated in step b or only a part of it is reacted with oxygen. The operation depends in detail on how high the preheating temperature of the oxygen should go, and on the size of the coke content of the solids mixture as well as on the permissible dilution of the preheated oxygen containing gas mixture with the combustion products. Too great a dilution of the gas mixture is disadvantageous because, in that case, the chlorine containing gas recovered in step d is also too highly diluted.

Any unreacted ferric iron chloride present in the chlorine containing gas leaving step d may be separated therefrom in a manner known as such, prior to further use of the chlorine containing gas mixture.

The process according to the invention can be carried out at normal pressure. However, it is advantageous to use elevated pressure. Apart from other advantages (smaller apparatus, higher through-put, and so forth) an additional advantage in this form of operation is that following step d any unreacted ferric iron chloride does not have to be removed from the chlorine containing gas mixture and accordingly the gas mixture, freed of solid $Fe_2O_3$ may be introduced directly into a chlorinator without separation of unreacted ferric iron chloride.

The process according to the invention is applicable in numerous cases in which it is desired to recover chloride as well as the iron from anhydrous ferrous iron chloride containing contaminants such as coke, metal chlorides and the like. The process according to the invention is particularly suitable for the working up of the chlorinator dust occuring in the fluidized bed chlorination of ilmenite or other highly ferriferous titanium materials. It permits the working up of these dusts in simple devices without great expense of energy to produce a chlorine containing gas or gas mixture which can be used immediately for the chlorination of additional titanium materials. At the same time an iron oxide is obtained which, to a great extent, is substantially pure $Fe_2O_3$ and hence of commercial value. Moreover, the process can be easily regulated and controlled as well as adapted to particular requirements.

The invention is explained in more detail by the following example:

EXAMPLE 1

Chlorinator dust that had been obtained in the chlorination of ilmenite was employed. It had a particle size of less than 0.1 mm and the following composition in % by weight:

$FeCl_2$: 71%
Coke: 23%
$TiO_2$: 3%
$SiO_2$: 1.5%
$Al_2O_3$: 1.0%
CaO and MgO: 0.5%

The reaction of this chlorinator dust pursuant to step a was carried out in an oxidation reactor which consisted of a 3 meter long masonry-lined pipe having an inner diameter of 140 mm; and provided at its front end, axially thereof, with a two component burner. The reaction could be exhausted from the opposite end of the reactor pipe.

Before the chlorinator dust was introduced into the two component burner the pipe was heated up to 700° C. by burning carbon monoxide in oxygen. Subsequently the chlorinator dust was added through the two component burner at a through-put of 100 kg/hr. At the same time 10 standard m³/hr. carbon monoxide and 8.5 standard m³/hr. oxygen at room temperature were introduced (volume figures of the gases in standardized state, i.e. 0° C and 760 Torr). During the reaction a temperature of 750° C. was reached in the pipe.

After leaving the pipe the solid material-gas suspension was separated in a cyclone. From the cyclone a solid mixture was drawn off at the rate of 40-41 kg/hr. which mixture had the following composition (in % by weight):

Coke: 53.8%
$TiO_2$: 7.2%
$Fe_2O_3$: 31.8%
$SiO_2$, $Al_2O_3$, CaO, MgO: 7.2%

The gas mixture escaping from the cyclone consisted mainly of ferric iron chloride and carbon dioxide and was then axially introduced with 6.5 standard m³/hr. oxygen at temperature of 750° C. into a pipe of 4 m length that had an inner diameter of 150 mm and was cooled from the outside with water. In this pipeline the reaction took place according to step c. The temperature at the entrance end of the pipe was about 780° C. initially and then went down to 350° C. at the exit end of the pipe.

The reaction products so obtained comprised particulate solids and gases and was passed at 350° C. into a bag filter (filter surface 0.7 sq. m). From the bag filter a solid material was recovered in an amount of 28 kg/hr. having the following composition (in % by weight):

$Fe_2O_3$: 98.9%
Coke: 0.69%
$TiO_2$: 0.17%
$SiO_2$, $Al_2O_3$, CaO, MgO: 0.17%

Simultaneously a gas mixture amounting to 23 standard m³/hr. was drawn off having the following composition (in volume %):

$CO_2$: 43.0%
$O_2$: 3.5%
$Cl_2$: 50.0%
$FeCl_3$: 3.5%

As a gas mixture comprising 50% chlorine, it was quite suitable for the chlorination of ilmenite. This experiment was carried out without interruption for 72 hours.

Instead of pipes, other known devices suitable for this purpose may be employed. Also other known separators may be used instead of the separators mentioned herein. For example, the separation of pure iron oxide in step d may be carried out by means of a cyclone.

The process of this invention thus provides a simple, direct and economical method for recovering substantially pure iron oxide and gaseous chlorine or a gaseous mixture of chlorine and other gases from chlorinator dust using relatively low temperatures whereby relatively inexpensive equipment may be used; and in a manner such that continuous operation may be carried out without malfunctioning, clogging and so forth.

While this invention has been described and illustrated by the examples shown, it is not intended to be strictly limited thereto, and other variations and modifications may be employed within the scope of the following claims.

We claim:

1. A multistage process for recovering gaseous chlorine and solid ferric oxide from chlorinator dust, said dust produced in the chlorination of titaniferous ores and comprising particulate ferrous chloride plus contaminates, said process comprising the steps of: (a) reacting said chlorinator dust at temperatures of from 500° to 800° C. with oxygen in an amount sufficient only to form solid materials consisting essentially of particulate ferric oxide and gases consisting essentially of varporous ferric chloride; (b) separating the solid materials including the particulate ferric oxide from the gases produced in step a while maintaining the temperature in the range from 500° to 800° C.; (c) reacting the vaporous ferric chloride produced in step a with additional oxygen to form particulate ferric oxide and gases consisting essentially of gaseous chloride, the reaction in stage c being initiated at temperature from 600° to 800° C. followed by gradual lowering of the temperature to below 600° C.; and then (d) separating the particulate ferric oxide from the gases produced in stage c.

2. Multistage process for recovering gaseous chloride and solid ferric oxide from chlorinator dust according to claim 1 wherein the gases recovered in stage b include carbon dioxide.

3. Multistage process for recovering gaseous chlorine and solid ferric oxide from chlorinator dust according to claim 1 wherein the gases formed in stage a include gaseous ferric chloride and carbon dioxide. f

4. Multistage process for recovering gaseous chlorine and solid ferric oxide from chlorinator dust according to claim 1 wherein the temperature in stage c is lowered from between 600 and 800° C. to about 350° C.

5. Multistage process for recovering gaseous chlorine and solid ferric oxides from chlorinator dust according to claim 1 wherein elevated pressures are employed.

6. Multistage process for recovering gaseous chlorine and solid ferric oxides from chlorinator dust according to claim 1 wherein the gases formed in stage c are recycled to the chlorinator.

7. Multistage process for recovering gaseous chlorine and solid ferric oxide from chlorinator dust according to claim 1 wherein the solid materials produced in stage a includes both particulate ferric oxide and coke, reacting said solid materials with excess oxygen at temperatures above the ignition temperature of the coke to form a preheated mixture of gaseous oxygen and $CO_2$, separating the preheated gases from the solid material and recycling the preheated gases to stage a.

UNITED STATES PATENT OFFICE
CERTIFICATE OF CORRECTION

Patent No. 4,060,584          Dated November 29, 1977

Inventor(s) ACHIM HARTMANN; ACHIM KULLING; HANS THUMM

It is certified that error appears in the above-identified patent and that said Letters Patent are hereby corrected as shown below:

Claim 1, line 51, "var-" should read --vap- --

Claim 1, line 58, "chloride" should read --chlorine--

Claim 2, line 63, "chloride" should read --chlorine--

Signed and Sealed this

Twenty-eighth Day of March 1978

[SEAL]

Attest:

RUTH C. MASON
Attesting Officer

LUTRELLE F. PARKER
Acting Commissioner of Patents and Trademarks